United States Patent [19]

Dochterman

[11] 4,373,696
[45] Feb. 15, 1983

[54] MOTOR MOUNTING ARRANGEMENT, DEVICE FOR MOUNTING A MOTOR, AND METHODS

[75] Inventor: Richard W. Dochterman, Fort Wayne, Ind.

[73] Assignee: General Electric Company, Fort Wayne, Ind.

[21] Appl. No.: 156,275

[22] Filed: Jun. 4, 1980

[51] Int. Cl.³ .......................................... F16M 13/00
[52] U.S. Cl. ................................. 248/604; 248/222.3; 416/244 R
[58] Field of Search .................. 248/604, 603, 222.3, 248/222.2; 416/244 R; 310/51, 91; 24/221 K, 221 R, 221 A; 219/93

[56] References Cited

U.S. PATENT DOCUMENTS

| | | | |
|---|---|---|---|
| 1,838,935 | 12/1931 | Fixsen | 248/222.3 |
| 2,096,621 | 10/1937 | Skolfield | 248/604 |
| 2,757,893 | 8/1956 | Merz | 248/222.2 |
| 3,037,733 | 6/1962 | Roman | 248/222.3 X |
| 3,067,488 | 12/1962 | Bennett | 219/93 X |
| 3,774,009 | 11/1973 | Hodges | 219/93 X |
| 3,848,837 | 11/1964 | Dochterman | 310/91 X |
| 3,903,443 | 9/1975 | Carlson | 310/91 |
| 4,063,060 | 12/1977 | Litch | 219/93 |
| 4,076,197 | 2/1978 | Dochterman | 310/91 X |
| 4,161,667 | 7/1979 | Buckman | 248/603 X |
| 4,200,257 | 4/1980 | Litch | 248/604 |
| 4,293,114 | 10/1981 | Lykes | 248/604 |

FOREIGN PATENT DOCUMENTS 1142142  2/1969  United Kingdom ............ 24/221 K

Primary Examiner—J. Franklin Foss
Attorney, Agent, or Firm—Ralph E. Krisher, Jr.

[57] ABSTRACT

A method of manufacturing a torsionally flexible vibration isolating device adapted for mounting an electric motor. The device includes a flexible mounting arm having a motor end portion with projection accommodating means therein and a pair of supporting means for engagement with the motor end portion. In this method, one supporting means is formed with a pair of projections extending therefrom in different directions. The motor end portion is interposed between the supporting means, and one projection is located in predetermined spaced relation with the motor end portion while the other projection is located in the projection accommodating means so as to interface with a part of the other supporting means. The other projection is then deformed into displacement preventing with the other supporting means at least adjacent the interfacing part thereof.

Motor mounting arrangements, devices for mounting an electric motor, other methods of manufacturing, and methods of mounting are also disclosed.

27 Claims, 29 Drawing Figures

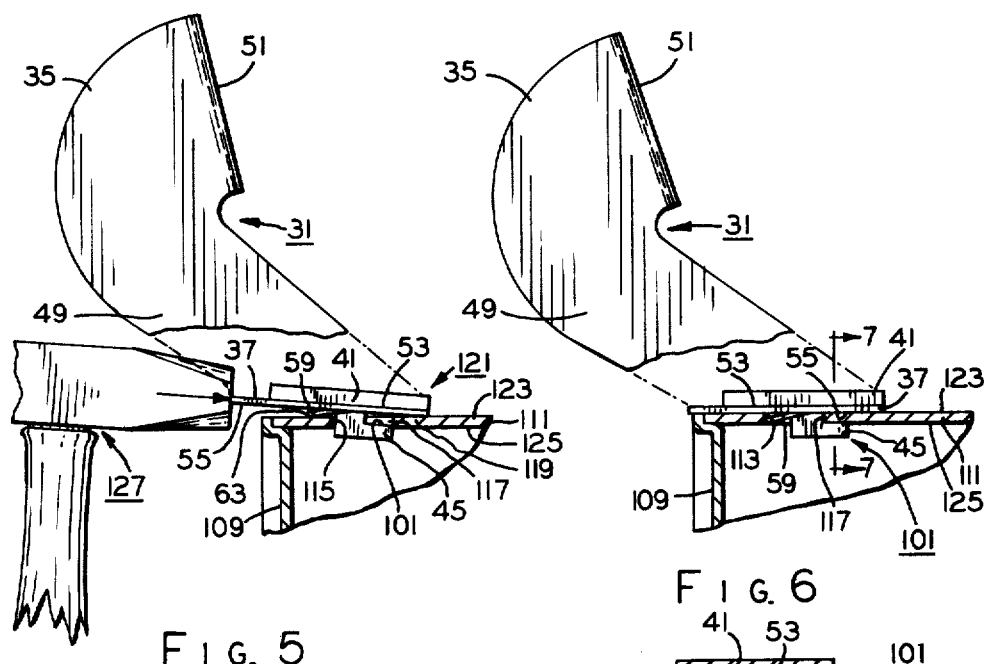
FIG. 5
FIG. 6
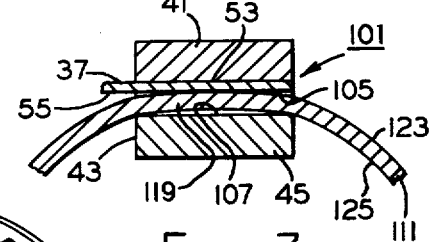
FIG. 7
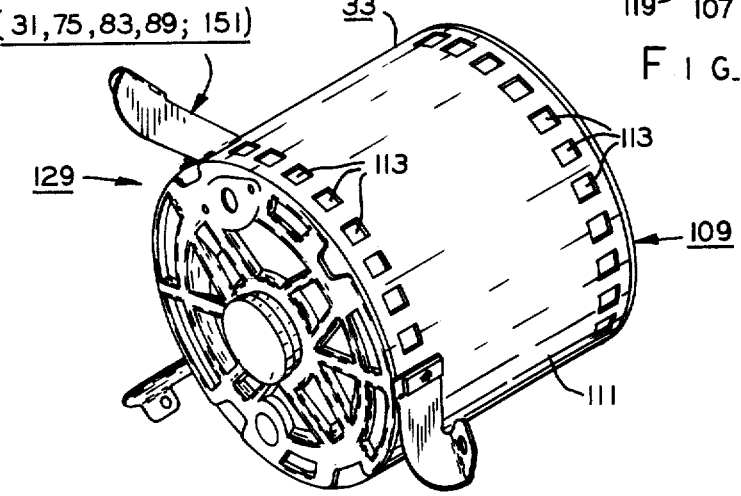
FIG. 8

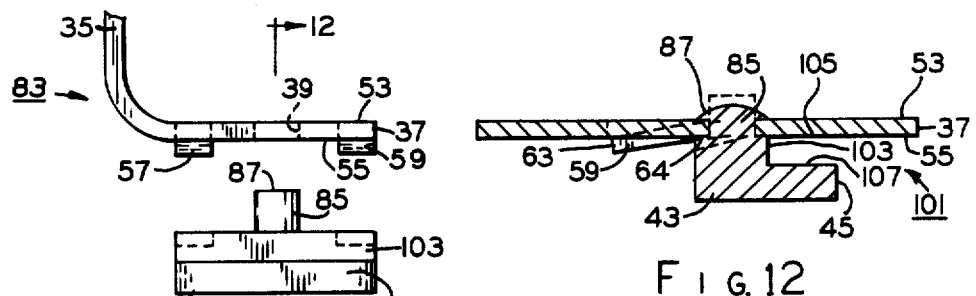
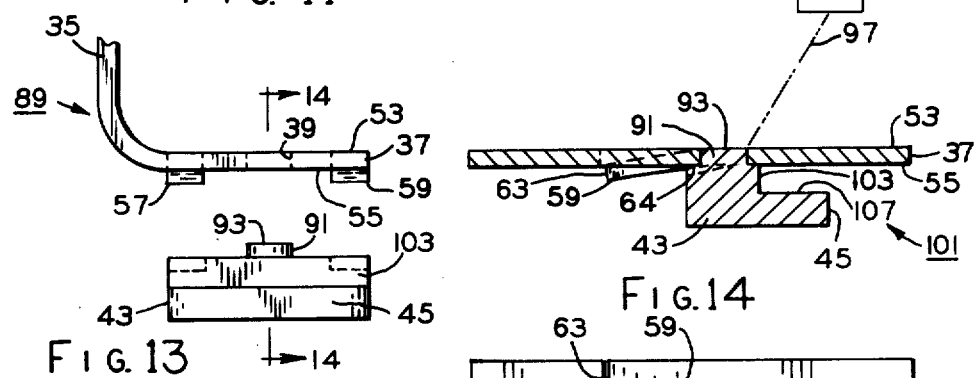
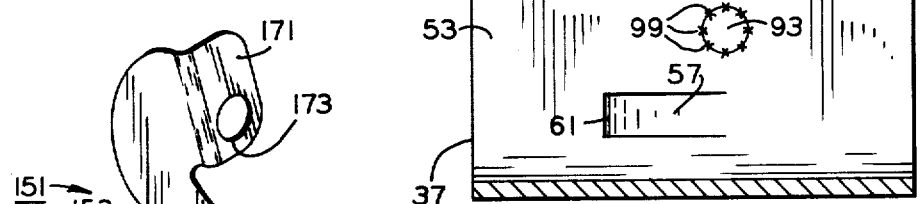
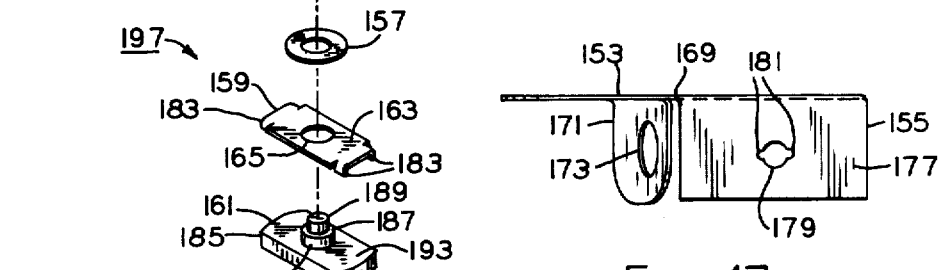

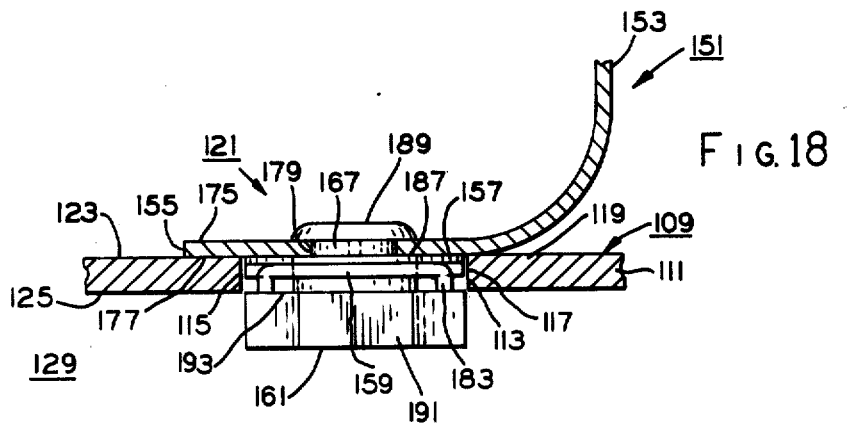
FIG. 18
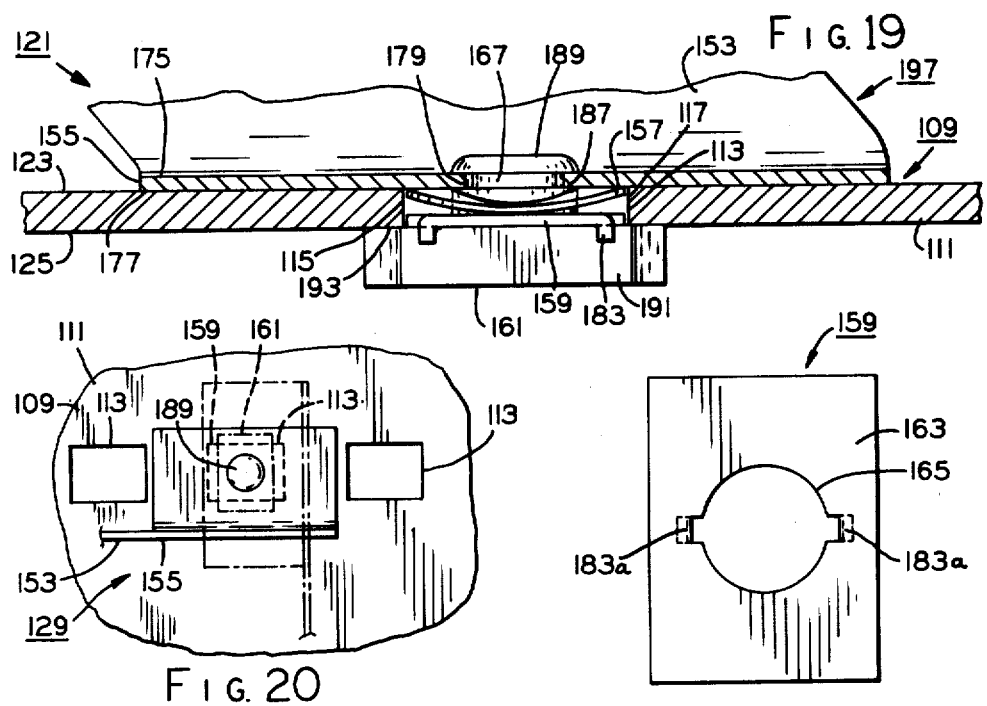
FIG. 19
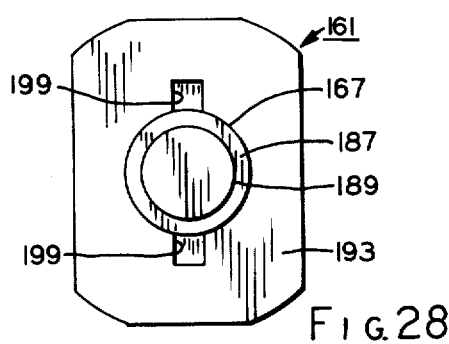
FIG. 20
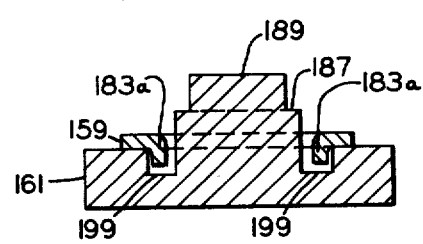
FIG. 27
FIG. 28
FIG. 29

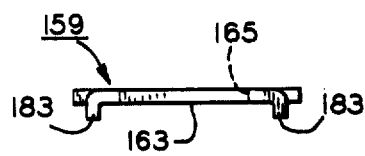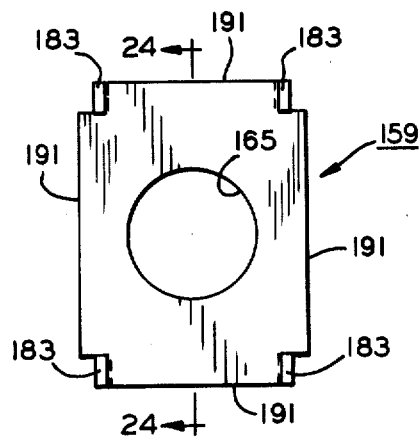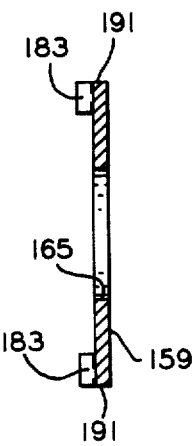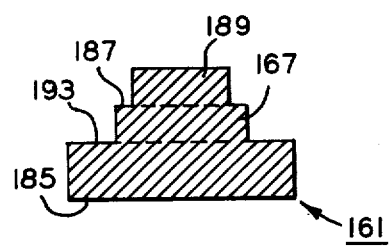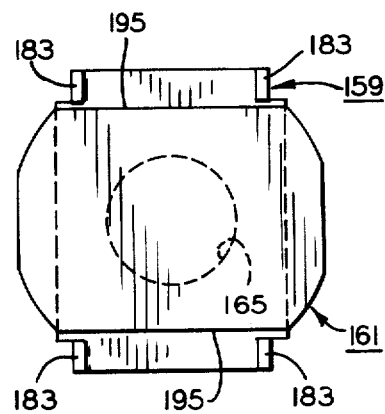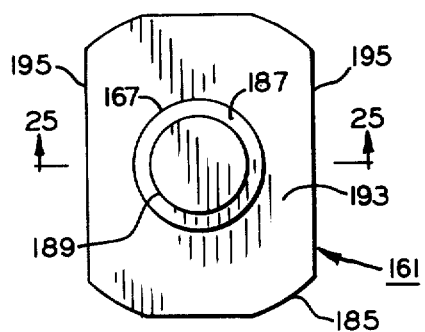

MOTOR MOUNTING ARRANGEMENT, DEVICE FOR MOUNTING A MOTOR, AND METHODS

FIELD OF THE INVENTION

This invention relates in general to electric motors and in particular to motor mounting arrangements, devices for mounting an electric motor, method of manufacturing such devices, and methods of mounting such devices.

BACKGROUND OF THE INVENTION

In air moving apparatus incorporating blowers, the blower wheels are supported within blower housings which are typically dimensioned and positioned such that relatively close running tolerances are maintained in the interest of maximizing blower efficiency. In direct drive applications, the motor is suspended from the blower housing, and a motor shaft in turn supports and drives the blower wheel within the housing. Examples of apparatus wherein mounting arrangements of this type are utilized include room air conditioners, air circulation fans, and the like.

In applications where the blower is mounted directly to the motor shaft, it is believed to be desirable to isolate motor vibrations from the housing structure so as to minimize the transmission of noise thereby achieving quieter operation. Not only must mounting arrangements reduce the transmission of motor vibration, but they must provide sufficient mounting rigidity to avoid excessive axial and tilting movement of the motor during operation. In the past, to achieve these ends, motor mounting arrangements have been provided with mounting arms which had low torsional spring constants, and yet had sufficient strength to withstand not only the vibrations encountered during operation but also the shipping and handling loads for the motor and blower assemblies. The spring constants of the mounting arms for the axial, radial and tilting vibration modes were selected so that the characteristic vibration transmissibility ratios for these modes were close to unity. However, the characteristic torsional mode of vibration transmissibility was substantially less than unity because of the flexibility of the arms. Such prior art mounting arrangements are disclosed in U.S. Pat. No. 4,063,060 issued Dec. 13, 1977 to Ernest W. Litch III and U.S. Pat. No. 4,076,197 issued Feb. 28, 1978 to Richard W. Dochterman, and each of such patents are incorporated herein by reference.

In many instances in the past, it has been desirable to permanently attach mounting arms to a motor shell or housing when manufacturing original equipment motors. For a replacement or aftermarket motor, however, it has been more customary to mount such motor by various different means, such as for instance bolts, welded straps, or bands removably affixed to a housing of such motor. This is believed not only to have avoided the necessity for purchasing a motor which had a mounting arrangement customized to a particular application but also to have afforded much more flexibility in selecting a replacement motor. The mounting arms, which may have been of the type disclosed in the aforementioned Litch and Dochterman patents, may have been connected to straps or bands by suitable means, such as welding for example.

In past, many electric motors included vent or other openings or the like, which have been arranged generally in a circular array adjacent one end of the motor housing with another similar array of such vent openings located near the other end of the motor housing. During operation of these motors, air flowed through the vent openings and was utilized to cool the windings and the bearings of the motor. Although the primary purpose of the aforementioned vent openings was to enable greater cooling of the motor, they have, in the past, been utilized to provide a spaced connection between the motor housing and a mounting band or strap or the like which encircled the motor housing to enable mounting of the motor to a member which was adapted to support a motor having a larger peripheral configuration. Such a mounting arrangement is disclosed in U.S. Pat. No. 3,848,837 issued Nov. 19, 1974 to Richard W. Dochterman. In this patent, clip members either straddled the portions of the motor housing between the vent openings or were insertable within the vent openings, and the band or strap was supported thereon. In either event, the clips interlocked with the vent openings in a resilient fashion.

In the aforementioned U.S. Pat. Nos. 4,063,060 and 4,076,197, the mounting arms thereof were rigidly connected to a housing of an electrical motor. Although these mounting arrangements were accomplished by welding the mounting arms directly to the motor shell, as was customarily done during manufacturing of original equipment motors, such a mounting arrangement was not feasible in the case of replacement motors which required a wide variety of mounting arm lengths and configurations to properly mount such replacement motors into various blower housings.

SUMMARY OF THE INVENTION

Among the several objects of the present invention may be noted the provision of improved motor mounting arrangements, improved devices for mounting an electric motor, improved methods of manufacturing such devices, and improved method of mounting such devices which overcome at least some of the disadvantageous or undesirable features of the prior art; the provision of such improved arrangements, devices and methods in which flexible mounting arms for a replacement motor can be quickly and easily connected to a stationary assembly of such motor; the provision of such improved arrangements, devices and methods in which the mounting arms may be connected to such stationary assembly of such motor so as to enable such arms to accomplish their intended damping of torsional, axial and tilting movements of such motor; the provision of such improved arrangements, devices and methods in which such arms are positively locked into engagement with openings in such stationary assembly of such motor but are removable therefrom; and the provision of such improved arrangements, devices and methods in which the components thereof are simple in design, economically manufactured and easily assembled. These as well as other objects of the present invention will be in part apparent and in part pointed out hereinafter.

In general, a method in one form of the invention is presented for manufacturing a torsionally flexible vibration isolating device adapted for mounting an electric motor. The device includes a flexible mounting arm having a motor end portion with projection accommodating means therein and a pair of supporting means for engagement with the motor end portion of the arm. In this method, one of the supporting means is formed with a pair of projections extending therefrom in different directions. The motor end portion of the mounting arm is interposed between the supporting means, and one of the projections is located in predetermined spaced relation with the motor end portion while the other of the projections is located in the projection accommodating means of the motor end portion so as to interface with a part of the other of the supporting means. The other projection is deformed into displacement preventing engagement with the other supporting means at least adjacent the interfacing part thereof.

Also in general and in one form of the invention, a method is provided for manufacturing a torsionally flexible vibration isolating device adapted for mounting an electric motor. The device includes a flexible mounting arm having a motor end portion, a pair of means adapted for rotation relative to each other, and a spring. In this method, one of the rotation means is interposed between the other of the rotation means and the motor end portion of the arm, and the spring is biased between the motor end portion and the one rotation means. The other rotation means is interconnected with the motor end portion of the arm so as to be conjointly rotatable therewith with respect to the one rotation means.

Furthermore in general, a method is provided in one form of the invention for mounting a torsionally flexible vibration isolating device to a housing of an electric motor. The housing has an opening therein defining a pair of opposed abutment surfaces and an arcuate lip portion on the housing adjacent at least one of the opposed abutment surfaces. The device has a motor mounted section with a pair of opposed locking means thereon for association with the housing. In this method, one of the locking means is forced against the housing toward an assembly position extending generally about the arcuate lip portion, and thereby at least a part of the arcuate lip is elastically deformed into gripping engagement with the one locking means when it is in its assembly position. The other of the locking means is inserted into the opening and into gripping engagement with the other of the abutment surfaces generally simultaneously with the deformation of the lip into the gripping engagement with the one locking means.

Still further in general and in one form of the invention, a method is provided for mounting a torsionally flexible vibrating isolating device to a stationary assembly of an electric motor. The stationary assembly has a pair of opposed surfaces with an opening therebetween. The device includes a flexible arm having a motor end portion, abutment means for fixed interconnection in spaced relation with the motor end portion, and resiliently urged means for engagement with the abutment means. In this method, the opposed surfaces of the stationary assembly are captured between the motor end portion and the abutment means upon the conjoint rotation thereof to a preselected assembly position of the arm, and the resiliently urged means is biased at least in part within the opening into rotation preventing engagement between the stationary assembly and the abutment means.

In general, a torsionally flexible vibration isolating device in one form of the invention is adapted to be removably secured with a part of an electric motor. The device includes a flexible arm, and a motor end flange integral with the arm and having a pair of opposite surfaces. A locking lug is seated against one of the surfaces of the motor end flange and is secured to the motor end flange. A projection on the locking lug extends therefrom in one direction and in predetermined spaced relation with the one surface of the motor end flange, and the projection and one surface of the motor end flange define groove means adapted for releasably gripping the electric motor part when the device is removably secured therewith. Means lanced from the motor end flange so as to extend through the one opposite surface and in another direction generally opposite the one direction is adapted for interference fitting in engagement with the electric motor part when the device is removably secured thereto.

In general, another torsionally flexible vibration isolating device in one form of the invention is adapted for mounting an electric motor. The device includes a flexible arm having a motor end portion with projection accommodating means therein, and a pair of means for capturing therebetween the motor end portion of the arm. A first projection on one of the capturing means is received in the projection accommodating means of the motor end portion and has a first part thereof interfacing with a second part of the other of the capturing means, and the first projection is deformed at least adjacent the first interfacing part thereof into displacement preventing engagement with the other capturing means at least adjacent the second interfacing part thereof. A second projection on one of the one and other capturing means is arranged so as to extend in predetermined spaced relation with the motor end portion of the arm.

Also in general and in one form of the invention, a torsionally flexible vibration isolating device is adapted for mounting an electric motor. The device includes a flexible arm having a motor end portion, and a pair of means adapted for rotation relative each other, one of the rotation means being fixedly interconnected with the motor end portion. Means is provided for resiliently urging the rotation means toward engagement, and means on the rotation means is provided for interlocking in engagement with each other upon the relative rotation of the rotation means into a preselected rotated position.

Also in general, a motor mounting arrangement in one form of the invention includes an electric motor having a stationary assembly, and a plurality of openings is arranged in preselected locations in the stationary assembly with each of the openings defining a pair of opposed edges on the stationary assembly, respectively. A plurality of torsionally flexible vibration isolating devices have flexible arms with motor mounting sections thereon associated with respective ones of the openings in displacement preventing engagement with the stationary assembly, respectively, and each of the motor mounted sections includes means for gripping in deforming engagement with a pair of opposed parts of the stationary assembly generally adjacent one of the opposed edges of a respective one opening, and means for interfering fitting in engagement with the other of the opposed edges of the respective one opening.

Further in general and in one form of the invention, a motor mounting arrangement includes an electric motor having a stationary assembly, and a plurality of openings respectively arranged in preselected locations in the stationary assembly. A plurality of torsionally flexible vibration isolating devices have flexible arms with motor mounted sections thereon associated with respective ones of the openings in displacement preventing engagement with the stationary assembly, respectively. Each of the motor mounted sections includes flange means on one of the arms for gripping in engagement with a part of the stationary assembly generally about a respective one opening, and means interconnected with the flange means extends through the respective one opening for gripping in engagement with another part of the stationary assembly generally about the respective one opening and in opposed relation with the first named stationary assembly part. Means disposed in the respective one opening is adapted for rotation preventing engagement therewith and is provided with means for interlocking in rotation preventing engagement with the gripping means. Resilient means is provided for urging the interlocking means into the rotation preventing engagement thereof with the gripping means.

BRIEF DESCRIPTION OF THE DRAWINGS

FIGS. 5 and 6 are partial sectional views illustrating principles which may be practiced in a method of mounting the device of FIG. 1 to a stationary assembly of an electric motor in one form of the invention, respectively;

FIG. 7 is an enlarged sectional view taken along line 7—7 of FIG. 6;

FIG. 8 is a reduced isometric view showing an electric motor with the devices of FIG. 1 mounted thereto;

FIGS. 9, 11 and 13 are exploded views showing a motor end section of alternative torsionally flexible vibration isolating devices in one form of the invention and illustrating principles which may be practiced in methods of manufacturing such devices also in one form of the invention, respectively;

FIGS. 10, 12 and 14 are sectional views taken along lines 10—10, 12—2 and 14—14 in FIGS. 9, 11 and 13, respectively;

FIG. 15 is a top elevational view of the motor mounted section of the device of FIG. 14;

FIG. 16 is an exploded view showing another alternative torsionally flexible vibration isolating device in one form of the invention and illustrating principles which may be practiced in a method of manufacturing such device also in one form of the invention;

FIG. 17 is an elevational view of a flexible arm of the device of FIG. 16 as viewed along line 17—17 therein;

FIGS. 18 and 19 are enlarged fragmentary sectional views illustrating principles which may be practiced in a method of mounting the device of FIG. 16 to a stationary assembly of an electric motor in one form of the invention;

FIG. 20 is a fragmentary plan view showing the device of FIG. 16 in its mounted position on the stationary assembly of the electric motor;

FIGS. 21 and 22 are enlarged plan views of the abutment members of the device of FIG. 16, respectively;

FIG. 23 is a top elevational view of the abutment member of FIG. 21;

FIGS. 24 and 25 are sectional views taken along lines 24—24 and 25—25 in FIGS. 21 and 22, respectively;

FIG. 26 is an elevational view of the abutment members of FIGS. 21 and 22 illustrating them in their interlocked position;

FIGS. 27 and 28 are top elevational views of alternative abutment members which may be utilized in the device of FIG. 16; and FIG. 29 is a partial sectional view of the alternative abutment members of FIGS. 28 and 27 illustrating them in their interlocked positions.

Corresponding reference characters indicate corresponding parts throughout the several views of the drawings.

The exemplifications set out herein illustrate preferred embodiments of the invention in one form thereof, and such exemplifications are not to be construed as limiting the scope of the invention in any manner.

DETAILED DESCRIPTION OF THE PREFERRED EMBODIMENTS

Figure 1:
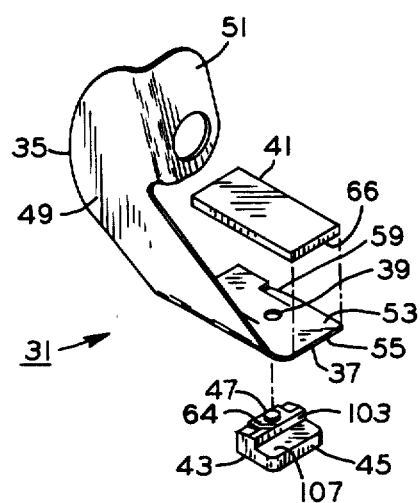
FIG. 1 is an exploded view showing a torsionally flexible vibration isolating device in one form of the invention and illustrating principles which may be practiced in a method of manufacturing such device also in one form of the invention.
Figure 2:
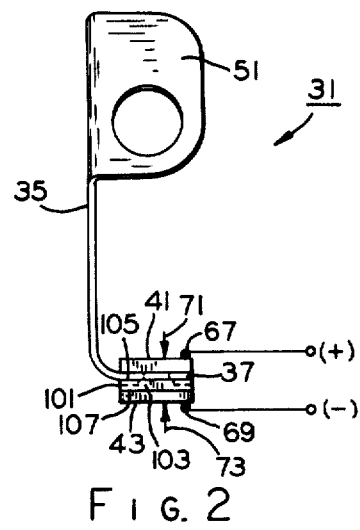
FIGS. 2 and 3 are respectively right side and bottom elevational views of the device of FIG. 1.
Figure 3:
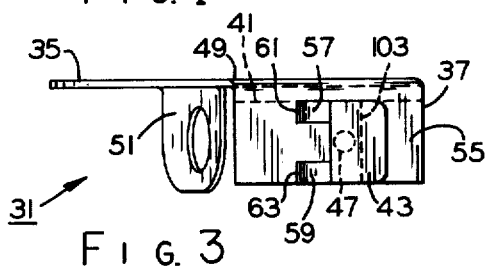
Figure 4:
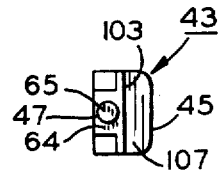
FIG. 4 is a plan view of one of the capturing members illustrated in FIG. 1.

Referring now to the drawings in general, there is illustrated in one form of the invention a method of manufacturing or making a torsionally flexible vibration isolating device 31 adapted for mounting a dynamoelectric machine, such as an electric motor 33 or the like. Device 31 includes a flexible mounting arm 35 having a motor end or end portion 37 with projection accommodating means, such as an opening or aperture 39 or the like therein, and a pair of supporting or capturing means 41, 43 are provided for engagement with the motor end portion of the arm (FIGS. 1 and 2). In this method, supporting means 43 is formed or otherwise provided with a pair of projections 45, 47 extending therefrom in different directions, respectively (FIGS. 1 and 4). Motor end portion 37 of arm 35 is interposed or otherwise captured between supporting means 41, 43, and projection 45 is located or otherwise arranged in predetermined spaced relation with the motor end portion while projection 47 is located or otherwise received in aperture 39 so as to interface with a part of supporting means 41 (FIGS. 1-3). Thereafter, projection 47 is deformed into displacement preventing engagement with supporting means 41 at least adjacent the interfacing part thereof (FIG. 2). The term interface, as utilized herein is intended to mean either two surfaces having a common boundary or two surfaces spaced closely adjacent each other so as to, in effect, have a common boundary.

More particularly and with specific reference to FIGS. 1 and 4, arm 35 may be stamped, lanced or otherwise formed from sheet steel having a martensitic grain structure. As employed herein, the term martensitic steel means steel that has been specially processed to transform the microstructure thereof to martensite from, for example, austenite; however, if a more detailed discussion of martensitic steel suitable for use in the present invention is desired, reference may be had to the aforementioned U.S. Pat. No. 4,063,060. An intermediate or shank portion 49 is integrally provided on arm 35 between motor end portion or flange 37 and a blower end portion or flange 51 thereof, and the blower end portion is adapted for mounting engagement with a blower housing of an air moving apparatus or the like (not shown). Both motor end portion 37 and blower end portion 51 of arm 35 are bent or otherwise deformed so as to extend in planes generally perpendicular to that of shank portion 49, and a mounting or bolt hole opening 53 is provided through the blower end portion. Whie blower end portion 51 is disclosed herein as an integral part of arm 35, it is contemplated that the arm may be integrally provided with other blower end portions having different configurations within the scope of the invention so as to meet the objects thereof. Motor end portion 37 of arm 35 has a pair of opposite surfaces or sides 53, 55 with which aperture 39 intersects, and resilient means, such as a pair of tabs or spring members 57, 59 or the like for instance, are lanced or otherwise deformed from the arm. Tabs 57, 59 are located generally adjacent aperture 39 and extend therefrom generally angularly, i.e. at an acute angle, downwardly from opposite or lower surface 55 of motor end portion 37 or with respect to the plane thereof, as best seen in FIGS. 1 and 3. A pair of free or distal ends 61, 63 are provided on tabs 57, 59, respectively, and the tabs as well as aperture 39 may be provided in motor end portion 37 either as arm 35 is formed from the martensitic sheet steel or subsequent to the bending of the motor end portion so as to extend generally perpendicular to shank portion 49, as mentioned above. Although motor end portion 37 of arm 35 is disclosed as having tab pair 57, 59 thereon, it is contemplated that more or less of such tabs may be provided and also have different configurations within the scope of the invention so as to meet the objects thereof.

The supporting means respectively comprise plate 41 and locking lug 43 which in one form of the invention are weldable members formed of a metallic material which may be welded, such as for instance steel, iron or a powdered iron or the like for instance, and it may be noted that projections or extensions 45, 57 on lug 43 are predeterminately arranged in a generally L-shaped configuration so as to extend generally perpendicularly with respect to each other. Projection 47 on lug 43 is inserted or otherwise positioned or passed into aperture 39 in motor end portion 37 so as to be received therein, and a shoulder or seating surface 64 on the lug is located or otherwise disposed in seating or abutting engagement against lower surface 55 of the motor end portion so as to extend generally about the aperture therein. With lug 43 so seated against lower surface 53 of motor end portion 37, it may be noted that a free end 65 of projection 47 extends slightly past upper surface 53 of the motor end portion, and it may be further noted that projection 45 of the lug is located or otherwise positioned or arranged adjacent lower surface 55 of the motor end portion in predetermined spaced relation therewith and so as to extend in a direction generally away from both aperture 39 and tabs 57, 59 of the motor end portion. It may also be noted that the predetermined spaced relation or distance between lug projection 45 and lower surface 55 of motor end flange 37 is just slightly greater than the thickness of the electric motor housing to which device 31 is attached, as discussed in greater detail hereinafter.

Plate 41 is provided with an interfacing side or lower surface 66 which is disposed or otherwise located or positioned generally in overlaying relation with upper surface 53 of motor end portion 37 at least closely adjacent thereto, and a part of the interfacing side of the plate is arranged or otherwise disposed so as to interface with free end 65 of projection 47 (See FIG. 4) when lug 43 is seated against lower surface 55 of the motor end portion. While lug 43 has been described as being located with respect to motor end portion 37 prior to plate 41, it is, of course, contemplated that the plate may be located simultaneously with or prior to the lug. With free end 65 of projection 47 interfacing with side 66 of plate 41, a pair of electrodes 67, 69 of a welding apparatus (not shown) may be associated or otherwise electrically connected with plate 41 and lug 43, and suitable means (not shown) may be employed to urge the plate and lug toward each other, as schematically illustrated by force arrows 71, 73 in FIG. 2, with motor end portion 37 interposed therebetween. Thereafter, the welding apparatus is energized passing a welding current between its electrodes 67, 69 through plate 41 and lug 43 so as to weld projection 47 to the plate at the interface thereof between free end 65 of projection 47 and side 66 of the plate. Upon this welding together of plate 41 and lug 43, the force illustrated by force arrows 71, 73 effects movement of plate 41 into abutting engagement with upper surface 53 of motor end portion 37 thereby to capture or otherwise trap it between the plate and the lug. It may be noted that plate 41 and lug 43 define or act as heat sink means so as to dissipate the welding heat caused by the welding current passed through the plate and the lug thereby to prevent excessive heat transmission to arm 35 which might effect a deleterious annealing thereof. Thus, with plate 41 and lug 43 so welded to motor end portion 37 of arm 35, it may also be noted that such plate and lug reinforce the motor end portion. While projection 47 is described herein as being integral with lug 43, it is contemplated that in one form of the invention such projection may be integral with plate 41 so as to be insertable through aperture 39 in motor end portion 37 into welded interface with lug 43 within the scope of the invention so as to meet the objects thereof. Further, while various jigs or other fixturing may be utilized to position or otherwise effect the assembly of the component parts illustrated in the above described method of manufacturing, as well as other methods discussed hereinafter, a description of such jigs or other fixturing is omitted for the sake of brevity and drawing simplicity.

Figure 9:
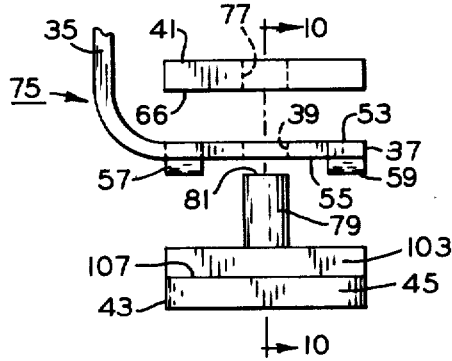
Figure 10:
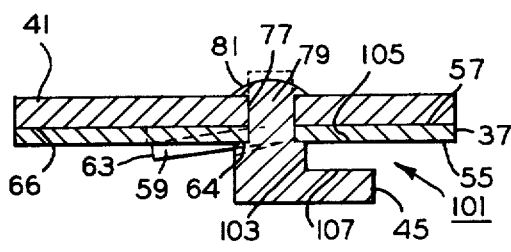

With reference to FIGS. 9 and 10, an alternative method of manufacturing an alternative torsionally flexible vibration isolating device 75 is illustrated in one form of the invention utilizing generally the same component parts and manufacturing steps discussed hereinabove with respect to device 31 and its manufacturing method with the exceptions noted hereinafter. While device 75 and its manufacturing method respectively meet at least some of the objects discussed hereinbefore, it is believed that such device and such manufacturing method may have other indigenous objects as may be in part apparent and in part pointed out in the following discussion.

In this method of manufacturing with respect to device 75, plate 41 and lug 43 are abutment members which may be formed of a metallic material having suitable malleable characteristics so as to lend itself to cold working or deformation. It may be noted that plate 41 is provided with an opening or aperture 77 therethrough, and it may also be noted that lug 43 is provided with a projection 79 having a length predeterminately greater than that of the previously discussed projection 47 of the lug, and projection 79 extends through both aperture 39 in motor end portion 37 and aperture 77 in the plate. In associating or otherwise assembling plate 41 and lug 43 with motor end portion 37, the plate is disposed or otherwise located in overlaying or abutting engagement with upper surface 53 of the motor end portion so that aperture 39 therein and aperture 77 of the plate are generally coaxially aligned. With plate 41 so seated on motor end portion 37, projection 79 of lug 43 is inserted or otherwise positioned or passed through apertures 39, 77, respectively, in the motor end portion and the plate so that a part of the projection interfaces in at least close adjacent relation with aperture 77 in the plate, and shoulder 64 of lug 43 is located or otherwise disposed in seating or abutting engagement against lower surface 55 of the motor end portion so as to extend generally about aperture 39 therein. Thus, it may be noted that motor end portion 37 is captured or otherwise trapped between plate 41 and lug 43, and it may be further noted that a free end or end portion 81 on projection 79 extends through aperture 77 in spaced relation above the plate, as best seen in FIG. 10. As previously mentioned, when lug 43 is so located against motor end portion 37, projection 45 of the lug extends in predetermined spaced relation with lower surface 55 of the motor end portion. Thereafter, free end 81 of projection 79 is deformed or otherwise cold worked or riveted over into displacement preventing engagement with plate 41 so as to extend generally about aperture 77 in the plate. Thus, it may be noted that projection 79 is deformed into displacement preventing engagement with plate 41 at least closely adjacent the interface therebetween, i.e. the aforementioned interface of the projection with aperture 77 in the plate. While plate 41 is disclosed hereinabove as being engaged with motor end portion prior to the engagement therewith of lug 43, it is contemplated that such plate and lug may be simultaneously engaged with the motor end portion or that the engagement therewith of the lug may precede the engagement of the plate with the motor end portion within the scope of the invention so as to meet the objects thereof.

With reference to FIGS. 11 and 12, another alternative method of manufacturing another alternative torsionally flexible vibration isolating device 83 is illustrated in one form of the invention utilizing generally the component parts and manufacturing steps discussed hereinabove with respect to device 31 and its manufacturing method with the exceptions noted hereinafter. While device 83 and its manufacturing method respectively meet at least some of the objects set out hereinbefore, it is believed that such device and such manufacturing method may have other indigenous objects as may be in part apparent and in part pointed out hereinafter.

In this manufacturing method with respect to device 83, lug 43 is an abutment member which may be formed of a metallic material having suitable malleable characteristics so as to lend itself to cold working or deformation. It may be noted that lug 43 is provided with a projection 85 having a preselected length less than that of the previously discussed projection 47 of the lug, and projection 85 of the lug extends only through aperture 39 in motor end portion 37. In associating or otherwise assembling lug 43 with motor end portion 37, projection 85 of the lug is inserted, positioned or otherwise passed through aperture 39 in the motor end portion, and shoulder 64 of the lug is located or otherwise disposed in seating engagement against lower surface 55 of the motor end portion so as to extend generally about the aperture therein. When lug 43 is so located against motor end portion 37, it may be noted that a free end 87 of projection 85 extends in spaced relation above upper surface 53 of the motor end portion, as illustrated in dotted outline in FIG. 12, and as previously mentioned, projection 45 of the lug is directed so as to extend in predetermined spaced relation with lower surface 55 of the motor end portion. Thereafter, free end 87 of projection 85 is deformed or otherwise cold worked or riveted over into displacement preventing engagement with upper surface 53 of motor end portion 37 so as to extend generally about aperture 39 therein.

With reference to FIGS. 13-15, another alternative method of manufacturing another alternative torsionally flexible vibration isolating device 89 is illustrated in one form of the invention utilizing generally the same component parts and manufacturing steps previously discussed with respect to device 31 and its manufacturing method with the exceptions noted hereinafter. While device 89 and its manufacturing method meets at least some of the objects discussed hereinabove, it is believed that such device and such manufacturing method may have other indigenous objects as may be in part apparent and in part pointed out in the following discussions.

In this method of manufacturing device 89, lug 43 is a weldable member formed of a metallic material suitable for welding, such as for instance steel, iron or a powdered iron or the like, and it may be noted that lug 43 is provided with a projection 91 having a preselected length less than that of the previously discussed projection 47 of the lug. A free end 93 of the projection is generally coextensive with upper surface 53 of motor end portion 37 when shoulder 64 of the lug is located in seating engagement with lower surface 55 of the motor end portion so as to extend generally about aperture 39 therein, as previously described. Also, as previously mentioned, when lug 43 is seated against motor end portion 37, projection 45 of the lug is directed so as to extend in predetermined spaced relation with lower surface 55 of the motor end portion. Thereafter, a laser apparatus of any suitable type well known to the art, as shown schematically at 95, is energized so as to project a laser beam, also shown schematically by dotted line 97, generally at the juncture or interface between free end 93 of projection 91 and aperture 39 in motor end portion 37 to effect a plurality of laser welds therebetween, as illustrated schematically at 99 in FIG. 15. In this manner, laser welds 99 effect the deformation of free end 93 on projection 91 into displacement preventing engagement with motor end portion 37 at least adjacent the interface therebetween, i.e. the aforementioned interface of the projection with aperture 39 in motor end portion 37. Laser apparatus 95 will create laser welds 99 with very localized heat, generally referred to as Heat Affect Zone. Thus, it is believed that laser welds 99 may be created in microseconds and with little or not heat to affect the temper of the martensitic steel utilized in arm 35.

Referring again in general to the drawings, and recapitulating at least in part with respect to the foregoing, torsionally flexible vibration isolating devices 31, 75, 83, 89 are disclosed each in one form of the invention for mounting electric motor 33 and adapted to be removably secured with a part of the electric motor (FIGS. 1-4, 8 and 9-15). Devices 31, 75, 83, 89 respectively comprise flexible arm 35, and motor end portion or flange 37 is integral with the arm and has opposite surfaces 53, 55 thereon (FIGS. 1-3 and 9-15). Locking lug 43 is seated against opposite surface 55 and is mounted on or otherwise secured to flange 37 (FIGS. 2, 3 and 9-15). Projection 45 on lug 43 extends therefrom generally in one direction in predetermined spaced relation with surface 53 of flange 37, and projection 45 and flange surface 53 define groove means 101 adapted for releasably gripping therebetween the part of the electric motor when devices 31, 75, 83, 89 are removably secured therewith, as discussed in greater detail hereinafter (FIGS. 1–4 and 9–15). Means, such as tabs 57, 59 for instance, is lanced from flange 37 so as to extend through surface 53 thereof in another direction generally opposite the aforementioned one direction and adapted for interference fitting engagement with the electric motor part when devices 31, 75, 83, 89 are removably secured therewith, as also discussed in greater detail hereinafter (FIGS. 1, 3 and 9–15).

More particularly and with specific reference to FIGS. 1–4, lug 43 is provided with an intermediate surface or wall 103 intersecting with projection 45 and shoulder 64 of the lug; therefore, when the lug is secured to flange 37 with the shoulder seated or abutted against lower surface 55 of the flange so as to extend generally about aperture 39 therein, as previously discussed, intermediate wall 103 defines a base wall of groove means 101 and intersects with a pair of opposed sidewalls 105, 107 thereof defined by flange lower surface 55 and lug projection 45. Of course, the respective projections 47, 79, 85, 91 of lug 43 are end received in aperture 39 of flange 37, and such projections are deformed so as to effect the securement of the lug to the flange, as discussed in detail hereinabove with respect to FIGS. 1, 2 and 9–15.

With reference again to the drawings in general and recapitulating at least in part with respect to the foregoing, there is illustrated in one form of the invention a method of releasably mounting a torsionally flexible vibration isolating device, such as any one of the previously discussed devices 31, 75, 83, 89 for instance, to a stationary assembly 109 of electric motor 33 (FIGS. 5–8), and while only device 31 is illustrated in such designated drawings, it is apparent that the other devices mentioned above may be so releasably mounted in the same manner as discussed hereafter. Stationary assembly 109 comprises at least a housing or shell 111 of electric motor 33, and an air vent or opening 113 is provided through the housing defining a pair of opposed edges 115, 117 on the housing with a generally arcuate lip or lip portion 119 of the housing adjacent edge 117 (FIGS. 5, 6 and 8). Device 31, as well as devices 75, 83, 89, has a motor mounting section, indicated generally at 121, which includes a pair of opposed locking means, such as for instance tabs 57, 59 and groove means 101, for association with stationary assembly 105 (FIGS. 5, 6 and 9–15). In practicing this method, locking means or groove means 101 is forced against stationary assembly 109 toward an assembly or mounted position extending generally about arcuate lip 119, thereby deforming elastically at least a part of the arcuate lip for releasably gripping engagement with the groove means when it is in its assembly position (FIGS. 5 and 7). Thereafter, locking means or tabs 57, 59 are inserted into opening 113 and into an interfering fit in releasable engagement with edge 115 generally simultaneously with the aforementioned deformation of lips 119 into the releasable gripping engagement with groove means 101 in its assembly position (FIGS. 6 and 7).

More particularly and with specific reference to FIGS. 5–8, motor mounting section 121 includes at least motor end flange 37 of arm 35, locking lug 43 mounted on the motor end flange, and tabs 57, 59 lanced from the motor end flange. Stationary assembly 109 further comprises a pair of opposed or generally radially spaced inner and outer circumferential surfaces 123, 125 on housing 111 which are intersected by opening 113. Thus, opposed edges 115, 117 of opening 113 are defined on housing 111 between inner and outer circumferential surfaces 123, 125 thereof, and lip portion 119 of the housing is defined between the inner and outer circumferential surfaces adjacent edge 117.

In effecting the releasable mounting engagement of device 31 to stationary assembly 109 of electric motor 33, the device may be manually moved with motor mounting section 121 thereof canted or otherwise tilted with respect to housing 111 and opening 113 therein so as to lead locking lug 43 into the opening with locking tabs 57, 59 trailing and disposed without the opening, as best seen in FIG. 5. Thereafter, groove means 101 of motor mounting section 121 are located at least generally adjacent edge 117 of opening 113, and opposite sidewalls 105, 107 of the groove means are respectively positioned at least generally adjacent opposed circumferential surfaces 123, 125 of stationary assembly 109 generally adjacent edge 117. With motor end flange 37 and locking lug 43 so arranged to position groove means 101 with respect to lip portion 119 of stationary assembly 109 adjacent edge 117 of opening 113, a tool 127, such as a hammer for instance, may be employed to apply a force onto motor end flange 37, which force is effective to drive opposite sidewalls 105, 107 of groove means 101 into overlaying gripping engagement with opposed circumferential surfaces 123, 125 of stationary assembly 109 adjacent edge 117 of opening 113 therein. When the aforementioned applied force is exerted on motor end flange 37, it may be noted that the gripping engagement of opposed sidewalls 105, 107 with opposed circumferential surfaces 123, 125 causes the elastic deformation or general flattening at least in part of the opposed circumferential surfaces so that they conform generally with the shape or configuration of the opposed sidewalls of the groove means, as best seen in FIG. 7. Thus, it may be noted that stationary assembly 109 will function generally as a very heavy spring so as to provide a rigid interconnection between device 31 and such stationary assembly. Of course, opposite sidewalls 105, 107 may be driven into gripping engagement with lip portion 119 of stationary assembly 109, as discussed above, until base wall 103 of the groove means becomes engaged in abutment with edge 117 of opening 113. Thereafter, locking tabs 57, 59 on motor end flange 37 may be inserted into opening 113 with free ends 61, 63 of the tabs being arranged in the aforementioned interfering fitting releasable engagement with opposed edge 115 of opening 113. With groove means 101 and tabs 57, 59 so interlocked in releasable gripping engagement with lip 119 and edge 115 of opening 113, device 31 and motor mounting section 121 are removably mounted in a preselected assembly or mounted position on stationary assembly 109 of electric motor 33. With device 31 in its preselected assembly position, it may be noted that the intensity or force of the gripping engagement of tabs 57, 59 and groove means 101 with stationary assembly 109 is predeterminately great enough to prevent undesirable disassociation of the device from the stationary assembly when electric motor 33 is mounted by such device, i.e. a plurality of such devices, in an air moving apparatus (not shown). However, it may also be noted that the force of the gripping engagements of tabs 57, 59 and groove means 101 with stationary assembly 109 may be overcome by an operator or service man to remove device 31 from its assembled position on the stationary assembly of electric motor 33, and such device may be subsequently mounted in its assembly position onto a replacement electric motor 33 in the same manner discussed hereinabove.

Referring again in general to the drawings and with further recapitulation at least in part with respect to the foregoing, a motor mounting arrangement, indicated generally at 129, is provided in one form of the invention (FIG. 8). In motor mounting arrangement 129, a plurality of openings 113 are provided in preselected locations in stationary assembly 109 of electric motor 33 with each of such openings respectively defining opposed edges 115, 117 on the stationary assembly (FIGS. 5, 6 and 8). A plurality of torsionally flexible vibration isolating devices, such as any of devices 31, 75, 83, 89 for instance, respectively have motor mounting section 121 thereof associated with preselected respective ones of openings 113 in releasable securing engagement with stationary assembly 109 generally in the same manner as discussed in detail hereinabove (FIG. 8). Each of motor mounting sections 121 includes means, such as for instance at least motor end flange 37 of arm 35 and lug 43 which define groove means 101, for releasable gripping in deforming engagement with a pair of opposed parts, such as circumferential surfaces 121, 125, of stationary assembly 109 which are respectively disposed generally adjacent opposed edge 117 of the aforementioned preselected respective ones of openings 113 (FIGS. 6 and 7). Further, each of motor mounting sections 121 also include means, such as tabs 57, 59 lanced from motor end flange 37, for interfering fitting in releasable engagement with opposed edge 115 of the aforementioned preselected respective ones of openings 113 (FIG. 5). Of course, blower end portion 51 on arm 35 of any of devices 31, 75, 83, 89 is adapted for attachment or mounting engagement with a blower housing of an air moving apparatus for instance (not shown) thereby to mount the electric motor, and for a more detailed discussion of such attachment of blower end portion 51, reference may be had to the aforementioned U.S. Pat. No. 4,063,060.

Still with reference in general to the drawings, there is illustrated in one form of the invention another alternative method of manufacturing or assembling a torsionally flexible vibration isolating device 151 (FIGS. 16, 17 and 21–25) adapted for mounting electric motor 33 (FIG. 8). Device 151, as well as the method of manufacturing it, a method of mounting it, and a mounting arrangement in which such device is employed, utilizes generally the same component parts and method steps previously discussed with respect to device 31 with the exceptions noted hereafter, and while device 151, the methods and mounting arrangement associated therewith meet at least some of the objects discussed above, it is believed that device 151 and such methods and mounting arrangement associated therewith may have other indigenous objects as may be in part apparent and in part pointed out hereinafter.

In this manufacturing method, device 151 includes a flexible arm 153 having a motor end portion or flange 155 thereon, a spring 157, and a pair of means, such as an abutment plate pair 159, 161, adapted for rotation relative to each other (FIGS. 16–19). Rotation means or plate 159 has a part, such as a body 163, with projection accommodating means, such as aperture 165, therein, and rotation means or plate 161 has an integral projection or extension 167 thereon (FIGS. 16–21). In practicing this method, plates 159, 161 are placed in an at-rest position against each other with body 163 of plate 159 spaced generally in overlaying relation with plate 161. Projection 167 on plate 161 is inserted, at least in part through aperture 165 in plate 159 (FIG. 16). Thereafter, motor end flange 155 of arm 153 is disposed adjacent plate 159, and spring 157 is biased or resiliently urged into engagement between the motor end flange and plate 159 (FIGS. 16 and 18). Motor end flange 155 and projection 167 are then interconnected so that arm 35 is conjointly rotatable with plate 161 relative to plate 159 (FIGS. 16 and 19).

More particularly and with specific reference to FIG. 16, arm 153 may be stamped, lanced, or otherwise formed from sheet steel having a martensitic grain structure generally in the same manner as the previously discussed arm 35, and a generally planar shank portion 169 of arm 153 is integrally formed between motor end flange 155 and a blower end portion or flange 171 which is adapted for mounting to a blower housing or shroud of an air moving apparatus for instance (not shown). Both motor and blower end flanges 155, 171 are bent or otherwise deformed so as to extend in planes generally perpendicular to that of shank portion 169, and a mounting opening 173 is provided through the blower end flange. While blower end flange 171 is disclosed herein as an integral part of arm 153, it is contemplated that the arm may be provided with other blower end portions having different configurations within the scope of the invention so as to meet the objects thereof. Motor end flange 155 of arm 153 has a pair of opposite surfaces or sides 175, 177. Aperture or opening 179, which includes a pair of oppositely extending ears 181, is provided in the motor end flange 155 and intersects with the opposite surfaces thereof.

Upon the assembly of plates 159, 161 together in their at-rest position, a plurality of abutments, such as depending legs 183, integral with body 163 of plate 159, are seated against body portion 185 of plate 161 thereby to predeterminately space apart the bodies of the plates. Of course, the insertion of projection 167 into aperture 165 in plate body 163 occurs prior to the aforementioned engagement of legs 183 with plate body 185. With plates 159, 161 so assembled together, spring means 157, such as a Belleville spring, may be assembled about projection 167 so as to engage with body 163 of plate 159 on a side thereof opposite plate 161. Thereafter, upon the insertion of projection 167 into opening 179 of motor end flange 155, a generally annular shoulder or seat 187 on the projection is seated against lower surface 177 of the motor end flange so as to extend generally about the opening therein. Of course, at least upon the seating of projection shoulder 187 with lower surface 177 of motor end flange 155, spring 157 is interposed in engagement between plate 159 and the lower surface of the motor end flange so as to be compressed or otherwise biased therebetween. With projection shoulder 187 so seated against motor end flange 155, a distal or free end portion 189 on projection 167 is deformed, swagged, or riveted over into displacement preventing engagement with upper surface 175 of the motor end flange so as to extend generally about opening 179 therein. Thus, motor end flange 179 is grippingly engaged between projection shoulder 187 and the deformed distal end 189 of projection 167; however, in order to insure the gripping or rotation preventing engagement of the projection and the motor end flange, it may be noted that a part of the projection may be cold flowed or otherwise moved into opposite ears 181 of opening 179 in the motor end flange. Thus, with projection 167 so secured in rotation preventing engagement with motor end flange 155, it may be noted that arm 153 and plate 161 are conjointly rotatable with respect to plate 159. Although legs 183 are disclosed as being on plate 159 and seated against plate 161, it is contemplated that such legs may be provided on plate 161 so as to seat against plate 159 when the plates are assembled together in the at-rest position thereof within the scope of the invention so as to meet at least some of the objects thereof.

With further reference to the drawings in general and further recapitulation with respect to the foregoing, there is illustrated in one form of the invention a method of mounting device 151 to stationary assembly 109 of electric motor 33 (FIGS. 8, 16 and 18-20). Stationary assembly 109 has opposed circumferential surfaces 123, 125 with opening 113 therebetween (FIGS. 8, 18 and 19). Device 151 includes arm 153 having motor end flange 155 thereon, abutment means, such as plate 161, for fixed interconnection in predetermined spaced relation with the motor end flange, and resiliently urged means, such as plate 159, for engagement with abutment means plate 161 (FIGS. 16, 18 and 19). In this method, opposed surfaces 123, 125 are captured or trapped between motor end flange 155 and plate 161 upon the conjoint rotation thereof to a preselected assembly position of arm 153, and resiliently urged plate 159 is biased toward a position at least in part within opening 113 of stationary assembly 109 into rotation preventing engagement therewith between the stationary assembly and plate 161 (FIGS. 19 and 20).

More particularly and with specific reference to FIGS. 8, and 16-26, device 121 may be manually moved with respect to stationary assembly 109 and opening 113 therein so as to lead plate 161 through the opening with plate 159, of course, following until lower surface 177 of motor end flange 155 on arm 153 is seated in outer circumferential surface 123 of the stationary assembly so as to extend at least in part generally about opening 113 therein. When motor end flange 155 is so seated against surface 123 of stationary assembly 109, it may be noted that opposite margins or side edges 191 of plate 159 are located in abutment or rotation preventing engagement between opposed edges 115, 117 of opening 113 in the stationary assembly, and it may be further noted an upper surface 193 on body 185 of plate 161 arranged in spaced facing relation with body 163 of plate 159 is located generally adjacent inner circumferential surface 125 of the stationary assembly. Thereafter, a rotative force may be applied or exerted on arm 153 of device 151 to effect the conjoint rotation of interconnected arm 153 and plate 161 toward a preselected assembly or rotated position thereof with respect to stationary assembly 109. Since opposite margins 191 of plate 159 are associated in displacement preventing engagement with opposed edges 115, 117 of opening 113 in the stationary assembly, both motor end flange 155 and plate 161 interconnected therewith are conjointly rotatable relative to plate 159 in response to the rotative force applied upon arm 153 to effect its rotation into the preselected assembly position. Upon the rotation of arm 153 to its preselected assembly position, it may be noted that upper surface 193 of plate 161 is rotated into gripping or abutting engagement with inner circumferential surface 125 of stationary assembly 109 generally adjacent opening 113 thereon. Thus, with opposed surfaces 123, 125 of stationary assembly 109 trapped between motor end flange 155 and plate 161, displacement of device 151 from the stationary assembly is obviated when arm 153 is in its preselected assembly position. Because of the curvature of housing 111, it may be noted that generally the same flattening thereof occurs as discussed hereinbefore so that circumferential surfaces 123, 125 are gripped in releasable engagement between motor end flange 155 and plate 161, and therefore, the spring action of the flattened parts of the housing provides a generally rigid connection between device 151 and stationary assembly 109 of electric motor 33. Of course, when arm 155 and plate 161 are rotated into their preselected assembly position relative to plate 159, upper surface 193 on body 185 of plate 161 is disengaged or from legs 183 on plate 159. Upon this rotative displacement of upper surface 193 on plate 161 from beneath legs 183 of plate 159, the compressive force of spring 157 biased between motor end flange 155 and plate 159, moves plate body 163 into abutment with upper surface 193 of plate 161. When plate bodies 163, 193 are so urged into engagement by the compressive force of spring 157, legs 183 on plate 159 are also moved into a position in interlocking engagement with cooperating or confronting margins 195 on plate 161. Even though plate 159 is so moved within opening 113 of stationary assembly, it may be noted that opposite margins 191 on plate 159 remain in abutment or rotation preventing engagement with opposed edges 115, 117 of the opening. Thus, plate 159 is maintained in its rotation preventing engagement with stationary assembly 109, and the interlocking association of legs 183 with margins 195 of plate 161 releasably retains plate 161 and arm 155 against displacement from the preselected assembly position thereof.

With further reference to the drawings in general and further recapitulating with respect to the foregoing, torsionally flexible vibration isolation device 151 is shown in one form of the invention as being adapted for mounting electric motor 33 (FIGS. 8 and 16-26). Device 151 includes arm 153 having motor end flange 155 thereon, and a pair of means, such as plates 159, 161 or the like for instance, adapted for rotation relative to each other (FIGS. 16 and 20). Means, such as legs 183 and plate margins or the like for instance, are provided for interlocking in engagement upon the relative rotation of plates 159, 161 into the preselected assembly or rotated position of device 151 with respect to electric motor 33 (FIGS. 19, 20 and 26). Resilient means, such as spring 157, is biased between motor end flange 155 and plate 159, and the resilient means or spring 157 is operable generally for moving plate 159 toward plate 161 to effect the engagement of interlocking means 183, 191 upon the relative rotation of the plates into the preselected rotated position thereof (FIGS. 16 and 18-20).

A motor mounting arrangement is also shown in one form of the invention (FIGS. 8 and 18-20). In this arrangement, electric motor 33 is provided with stationary assembly 109 having a plurality of openings 113 arranged in preselected locations in the stationary assembly. A plurality of devices 151 each include a motor end section 197 associated with respective ones of openings 113 in removable securing engagement with stationary assembly 109 (FIG. 8). Each of motor end sections 197 include flange means, such as motor end flange 155, for gripping engagement with a part such as outer circumferential surface 123, of stationary assembly 109 generally about a respective opening 113. Additionally, means such as plate 161 and its projection 167, are interconnected with motor end flange 155 and extend through the respective opening 113 for gripping engagement with another part, such as inner circumferential surface 125 of stationary assembly 109 generally about the respective one opening 113 (FIGS. 18 and 19). Further, each motor end section 197 includes means such as plate 159 for rotation preventing engagement with the respective one opening 113, and means for interlocking in rotation preventing engagement with gripping means or plate 161. Each section 197 also includes resilient means, such as spring 157, for urging the interlocking means into the rotation preventing engagement thereof with the gripping means or plate 161 (FIG. 19).

It is believed that the mounting arrangement of device 151 to stationary assembly 109 of electric motor 33 in the manner discussed above provides a very strong, as well as rigid, attachment therebetween that can withstand the rigors which may be caused by prolonged vibration of the electric motor upon the operation or energization thereof in an air moving apparatus. Further and as previously mentioned, it is also contemplated that the above discussed mounting arrangement may be disassembled so as to remove device 151 from stationary assembly 109 of electric motor 33. To accomplish such removal of device 151, a tool such as a screwdriver (not shown), may be extended through an opening 113 in stationary assembly 109 adjacent a respective one of such openings in which device 151 is mounted, and such tool may be inserted between plates 159, 161 to pry them apart against the compressive force of spring 157. When plates 159, 161 are so pried apart or otherwise displaced, arm 153 and legs 183 of plate 159 are displaced from their interlock with margins 191 of plate 161, and thereafter arm 153 and plate 161 may be conjointly rotated from the preselected assembly position thereof back to the original at-rest position thereof, with the legs engaged or resting upon upper surface 193 of plate 161. With plates 159, 161 so returned to the at-rest position thereof, such plates may be removed through opening 113 from stationary assembly 109 of electric motor 33.

Turning now to FIGS. 27–29, an alternative construction in one form of the invention is shown for interlocking in engagement between plates 159, 161 of device 151. In this interlock, a pair of diametrically opposite legs 183a are lanced from plate 159 adjacent aperture 165 therethrough, and a pair of cooperating diametrically spaced apart openings 199 are provided through plate 161 adjacent the base of projection 167. In the at-rest positions of plates 159, 161, legs 183a abut against plate 161 thereby to space apart bodies 163, 185 of the plates against the compressive force of spring 157 in the same manner as discussed above. However, upon the rotation of plate 161 to its preselected rotated position relative to plate 159, legs 183a enter into, and into interlocking engagement with, apertures 199 in plate 161.

In view of the foregoing, it is now apparent that novel torsionally flexible vibration isolating devices 31, 75, 83, 89 and 151, novel methods of manufacturing such devices, novel methods of mounting such devices and novel mounting arrangements are presented meeting the objects and advantageous features therefore, as discussed hereinabove, as well as others. It is contemplated that changes as to the precise configurations, arrangements, details and connections of the constructions of the component parts and also the precise order of the method steps illustrated herein by way of example may be made by those having ordinary skill in the art without departing from the spirit of the invention or the scope of the invention as set out in the claims which follow.

What I claim as new and desire to secure by Letters Patent of the United States is:

1. A method of manufacturing a torsionally flexible vibration isolating device adapted for mounting an electric motor, the device having a pair of weldable members adapted to cooperate as heat sink means, and a flexible mounting arm including a motor end flange having a pair of opposite surfaces with an opening extending therebetween through the motor end flange, the method comprising the steps of:

lancing at least one tab from the motor end flange of the mounting arm generally adjacent the opening therein and in a direction away from one of the opposite surfaces of the motor end flange;

providing one of the weldable members with a pair of projections arranged generally in an L-shaped configuration with respect to each other;

inserting one of the projections into the opening in the motor end flange and locating the other of the projections adjacent the other of the opposite surfaces of the motor end flange in predetermined spaced relation therewith and so as to extend generally in a direction away from both the at least one tab and the opening;

disposing the other of the weldable members in overlaying relation at least adjacent the one opposite surface of the motor end flange and interfacing the other weldable member with the one projection on the one weldable member inserted into the opening in the motor end flange;

associating a pair of electrodes with the weldable members and urging the weldable members toward each other with the motor end flange interposed therebetween;

passing a welding current through the weldable members so as to weld the one projection on the one weldable member to the other weldable member at the interface therebetween; and dissipating welding heat caused by the welding current along the heat sink means so as to prevent excessive heat transmission to the mounting arm.

2. The method as set forth in claim 1 wherein an aperture through the other supporting means defines the part thereof interfaced with the other projection of the one supporting means, and wherein the deforming step comprises displacing a distal end of the other projection into the displacement preventing engagement with the other supporting means generally about the aperture therethrough.

3. A method of manufacturing a torsionally flexible vibration isolating device adapted for mounting an electric motor, the device including a flexible mounting arm having a motor end portion with projection accommodating means therein, and a pair of supporting means that comprise a pair of weldable members for engagement with the motor end portion of the arm, the method comprising the steps of:

forming one of the supporting means with a pair of projections extending therefrom in different directions;

interposing the motor end portion of the mounting arm between the pair of the weldable members and respectively locating one of the projections in predetermined spaced relation with the motor end portion and the other of the projections in the projection accommodating means of the motor end portion so as to interface with a part of the other of the weldable members; and deforming the other projection into displacement preventing engagement with the other supporting means at least adjacent the interfacing part thereof; said deforming step comprising welding the other of the projections on one of the weldable members into the displacement preventing engagement with the part of the other of the weldable members interfaced therewith.

4. The method as set forth in claim 3 wherein the welding step comprises associating a pair of electrodes with the weldable members and passing a welding current through the weldable members so as to effect the welding of the other projection to the part of the other weldable member interfaced therewith.

5. The method as set forth in claim 3 comprising the additional step of dissipating welding heat through the weldable members acting as heat sink means so as to prevent excessive welding heat transmission to the mounting arm.

6. A method of manufacturing a torsionally flexible vibration isolating device adapted for mounting an electric motor, the device including a pair of weldable members adapted to cooperate as a heat sink, and a flexible mounting arm having a motor end portion with projection accommodating means therein, the method comprising the steps of:

forming one of the weldable members with a pair of projections;

disposing the motor end portion of the mounting arm between the weldable members and respectively positioning one of the projections in predetermined spaced relation with the motor end portion, and the other of the projections through the projection accommodating means of the motor end portion so as to interface a distal end portion of said other of the other projections with the other of the weldable members; and passing welding current through the weldable members and welding the distal end portion of the other projection to the other weldable member at the interface therebetween so as to trap the motor end portion of the mounting arm between the weldable members.

7. The method as set forth in claim 6 wherein the passing and welding step includes associating a pair of electrodes with the weldable members and urging at least one of the one and other weldable members toward the other of the one and other weldable members with the motor end portion of the mounting arm interposed therebetween.

8. The method as set forth in claim 6 comprising the additional step of dissipating welding heat caused by the welding current along the heat sink means so as to prevent excessive welding heat transmission to the mounting arm.

9. The method as set forth in claim 6 wherein the mounting arm is formed of a metallic material having a martinsitic microstructure.

10. A method of manufacturing a torsionally flexible vibration isolating device adapted for mounting an electric motor, the device including a flexible mounting arm having a motor end flange, a pair of opposite surfaces on the motor end flange, an aperture in the motor end flange intersecting with the opposite surfaces thereof, and a locking lug having a pair of projections thereon, the method comprising the steps of:

receiving in the aperture of the motor end flange one of the projections of the locking lug and positioning the other of the projections of the locking lug in predetermined spaced relation with one of the opposed surfaces of the motor end flange;

deforming the one projection of the locking lug into displacement preventing engagement with the other of the opposite surfaces of the motor end flange generally about the aperture therein and maintaining the predetermined space relation between the other projection of the locking lug and the one opposite surface of the motor end flange, and further comprising the preliminary step of lancing at least one tab from the motor end flange and extending the tab through the one opposite surface generally in a direction opposite that in which the other projection of the locking lug is positioned during the receiving and positioning step.

11. A method of manufacturing a torsionally flexible vibration isolating device adapted for mounting an electric motor, the device including a flexible mounting arm having a motor end flange, a pair of opposite surfaces on the motor end flange, an aperture in the motor end flange intersecting with the opposite surfaces thereof, and a locking lug having a pair of projections thereon, the method comprising the steps of:

receiving in the aperture of the motor end flange one of the projections of the locking lug and positioning the other of the projections of the locking lug in predetermined spaced relation with one of the opposed surfaces of the motor end flange;

deforming the one projection of the locking lug into displacement preventing engagement with the other of the opposite surfaces of the motor end flange generally about the aperture therein and maintaining the predetermined spaced relation between the other projection of the locking lug and the one opposite surface of the motor end flange; and wherein the receiving and positioning step comprises seating the locking lug against the one opposite surface of the motor end flange generally about the aperture therein.

12. A method of manufacturing a torsionally flexible vibration isolating device adapted for mounting an electric motor, the device including a flexible mounting arm having a motor end flange, a pair of opposite surfaces on the motor end flange, an aperture in the motor end flange intersecting with the opposite surfaces thereof, and a locking lug having a pair of projections thereon, the method comprising the steps of:

receiving in the aperture of the motor end flange one of the projections of the locking lug and positioning the other of the projections of the locking lug in predetermined spaced relation with one of the opposed surfaces of the motor end flange;

deforming the one projection of the locking lug into displacement preventing engagement with the other of the opposite surfaces of the motor end flange generally about the aperture therein and maintaining the predetermined space relation between the other projection of the locking lug and the one opposite surface of the motor end flange; and wherein the deforming and maintaining step comprises swagging a distal end portion of the one projection on the locking lug into the displacement preventing engagement with the other opposite surface of the motor end flange.

13. A method of manufacturing a torsionally flexible vibration isolating device adapted for mounting an electric motor, the device including a flexible mounting arm having a motor end flange, a pair of opposite surfaces on the motor end flange, an aperture in the motor end flange intersecting with the opposite surfaces thereof, and a locking lug having a pair of projections thereon, the method comprising the steps of:
receiving in the aperture of the motor end flange one of the projections of the locking lug and positioning the other of the projections of the locking lug in predetermined spaced relation with one of the opposed surfaces of the motor end flange;
deforming the one projection of the locking lug into displacement preventing engagement with the other of the opposite surfaces of the motor end flange generally about the aperture therein and maintaining the predetermined spaced relation between the other projection of the locking lug and the one opposite surface of the motor end flange; and wherein the deforming and maintaining step comprises welding the one projection into the displacement preventing engagement with the opposite surface of the motor end flange.

14. The method as set forth in claim 13 wherein the welding step comprises establishing a plurality of laser welds between the one projection and the opposite surface of the motor end flange.

15. A method of manufacturing a torsionally flexible vibration isolating device adapted for mounting an electric motor, the device including a flexible mounting arm having a motor end portion with a first opening therein, a spring, a pair of means adapted for rotation relative to each other, one of the rotation means having a projection therein and the other of the rotation means having a part with a second opening therein and a plurality of depending legs, the method comprising the steps of:
inserting the projection on the one rotational means through the second opening of the other rotational means;
seating the depending legs of the other rotational means on the one rotational means and arranging the part of the other rotational means generally in overlaying spaced relation with the one rotational means;
subsequently placing the spring on the other rotational means generally about the projection inserted through the second opening of the other rotational means;
moving the motor end portion of the mounting arm adjacent the other rotation means and against the spring thereon and inserting the projection of the one rotational means through the first opening of the motor end portion; and
deforming a distal end portion on the projection of the one rotation means into engagement with the motor end portion so that the one rotation means and the mounting arm are conjointly rotatable relative to the other rotation means.

16. A method of mounting a torsionally flexible vibration isolating device to a stationary assembly of an electric motor, the stationary assembly having a pair of opposed surfaces with an opening intersecting therebetween and defining a pair of opposed edges on the stationary assembly, the device including a flexible arm having a motor end portion, a locking tab lanced from the motor end portion, and a locking lug defining with the motor end portion a groove having a base wall interposed between a pair of opposite sidewalls, the method comprising the steps of:
leading the groove into the opening toward one of the opposed edges thereof with the locking tab trailing without the opening;
locating the groove adjacent the one opposed edge and positioning the opposite sidewalls of the groove generally adjacent parts of the opposed surfaces of the stationary assembly adjacent the one opposed edge, respectively;
forcing the opposite sidewalls of the groove into overlaying gripping engagement with opposed surface parts and flattening at least in part the opposed surface parts so as to conform generally with the opposite sidewalls of the groove;
seating the base wall of the groove in abutment with the one opposed edge; and
inserting the locking tab into the opening into interfering fitting engagement with the other of the opposed edges of the opening.

17. A method of mounting a torsionally flexible vibration isolating device to a housing of an electric motor, the housing having an opening therein defining a pair of opposed abutment surfaces and an arcuate lip portion on the housing adjacent at least one of the opposed abutment surfaces, and the device having a motor mounted section with a pair of opposed locking means thereon for association with the housing, the method comprising the steps of:
forcing one of the locking means against the housing toward an assembly position extending generally about the arcuate lip portion and thereby deforming elastically at least a part of the arcuate lip into displacement preventing engagement with the one locking means when it is in its assembly position; and
inserting the other of the locking means into the opening and into displacement preventing engagement with the other of the abutment surfaces generally simultaneously with the deformation of the lip into the displacement preventing engagement with the one locking means.

18. A method of mounting a torsionally flexible vibration isolating device to a stationary assembly of an electric motor, the stationary assembly having a pair of opposed surfaces and an opening intersecting the opposed surfaces and defining an edge therebetween, and the device including a flexible arm having a motor end portion, a pair of means adapted for rotation relative to each other with one of the rotation means being fixedly interconnected with the motor end portion, at least a pair of means on the other of the rotation means and engaged with the one rotation means for spacing the rotation means, and resilient means for engagement between the other rotation means and the motor end portion, the method comprising the steps of:
leading the rotation means into the opening in the stationary assembly;
associating the other rotation means generally in rotation preventing position in engagement with at least a part of the edge of the opening in the stationary assembly;
seating the motor end portion on one of the opposed surfaces of the stationary assembly generally about the opening therein;
rotating the arm and the one rotation means conjointly toward a preselected assembly position of the arm on the stationary assembly relative the other rotation means in the rotation preventing position thereof in engagement with the at least edge part of the opening as effected during the associating step;

engaging the one rotation means with the other of the opposed surfaces of the stationary assembly during the rotating step and obviating thereby the displacement of the device from the stationary assembly;

disassociating the one rotation member from the spacing means of the other rotation means generally as the arm and the one rotation means are conjointly rotated into the preselected assembly position of the arm; and driving the other rotation means in response to the compressive force of the resilient means toward the one rotation means, interlocking the at least spacing means pair with the one rotation means against further relative rotation thereby to maintain the device in its preselected assembly position, and maintaining the other rotation means in its rotation preventing position in engagement with the at least edge part of the opening.

19. A torsionally flexible vibration isolating device for mounting an electric motor and adapted to be removably secured with a part of the electric motor, the device comprising:

a flexible arm;

a motor end flange integral with said arm and having a pair of opposite surfaces;

a lug seated against one of said surfaces and secured to said flange;

a projection on said lug extending therefrom generally in one direction and in predetermined spaced relation with said one surface of said flange, said projection and said one surface defining groove means adapted for releasably gripping the electric motor part when the device is removably secured therewith; and means lanced from said flange so as to extend through said one surface in another direction generally opposite the one direction and adapted for interference fitting in engagement with the electric motor part when the device is removably secured therewith.

20. A torsionally flexible vibration isolating device adapted for mounting an electric motor, the device comprising:

a flexible arm having a motor end portion;

a pair of weldable means for capturing therebetween said motor end portion of said arm;

means on one of said weldable means for extension through said motor end portion and having a welded interface with the other of said weldable means; and another means on one of said one and other weldable means for extension generally in predetermined spaced relation with at least a part of said motor end portion.

21. A torsionally flexible vibration isolating device adapted for mounting an electric motor, the device comprising:

a flexible arm having a motor end portion;

an opening in said motor end portion;

a pair of weldable members respectively engaged with said motor end portion so as to capture it therebetween;

a first projection on one of said weldable members received in said opening and having a welded interface with the other of said weldable members;

a second projection on one of said one and other weldable members and extending therefrom in predetermined spaced relation with said motor end portion; and at least one tab lanced from said motor end portion so as to extend therefrom in a direction generally opposite that of the said second projection.

22. A torsionally flexible vibration isolating device adapted for mounting an electric motor, the device comprising:

a flexible arm having a motor end flange with a pair of opposite surfaces thereon;

an opening in said motor end flange intersecting with said opposite surfaces;

a pair of weldable members seated against said opposite surfaces and extending generally about said opening, respectively;

a first projection on one of said weldable members extending through said opening and having a welded interface with the other of said welded members thereby to capture said motor end flange between said weldable members;

a second projection on one of said one and other weldable members and extending therefrom in predetermined spaced relation with one of said opposite surfaces on a part of said motor end flange and in a direction generally away from said opening;

a pair of tabs lanced from another part of said motor end flange generally from the other of said opposite surfaces toward said one opposite surfaces so as to extend generally angularly from said another part of said motor end flange in another direction generally opposite that of said second projection;

a pair of free ends on said tabs arranged generally in predetermined spaced relation with said one opposite surface at said another part of said motor end flange; and a pair of shoulder means on said one of said one and other weldable members for accommodating the angular extension of said tabs from said another part of said motor end flange.

23. A torsionally flexible vibration isolating device adapted for mounting an electric motor, the device comprising:

a flexible arm having a motor end flange with a pair of opposite surfaces thereon;

a first opening in said motor end flange intersecting with said opposite surfaces thereof;

a pair of abutment means adapted for rotation relative each other toward a preselected rotated position;

a plurality of depending legs extending from one of said abutment means and seated on the other of said abutment means;

a second opening in said one abutment means;

a projection on said other abutment means extending through said first and second openings;

a free end on said projection deformed into displacement preventing engagement with said motor end flange and extending over one of said opposite surfaces of said motor end flange generally about said first opening therein;

a plurality of locking flats on said other abutment means arranged to accommodate said legs in interlocking engagement when said rotation means are in their preselected rotated position; and spring means extending about said projection and biased between said one abutment means and the other of said surfaces of said motor end flange for urging said depending leg plurality of said one abutment means into the interlocking engagement with said flat plurality of said other abutment means upon the relative rotation of the rotation means into the preselected rotated position thereof.

24. A motor mounting arrangement comprising:
an electric motor having a stationary assembly with a pair of opposed surfaces;
a plurality of openings arranged in preselected locations in said stationary assembly and each of said openings intersecting said opposed surfaces so as to define therebetween a pair of opposed edges on said stationary assembly, respectively;
a plurality of torsionally flexible vibration isolating arms each having a motor mounted section associated with a respective one of said openings in removable securing engagement with said stationary assembly, respectively, each of said motor mounted sections including flange means on said arm seated on said stationary assembly generally about said respective one of said openings for gripping in engagement with one of said opposed surfaces at least adjacent one of said opposed edges of said respective one of said openings, means connected with said flange means and extending through said respective one of said opening for gripping engagement with the other of said opposed surfaces at least adjacent said one opposed edge of said respective one of said openings, and means deformed from said arm flange means and operable generally for interfering fitting in engagement with the other of said opposed edges within said respective one of said opening.

25. A motor mounting arrangement comprising:
an electric motor having a stationary assembly with a pair of opposed surfaces;
a plurality of openings arranged in preselected locations in said stationary assembly and each of said openings intersecting said opposed surfaces so as to define therebetween a pair of opposite edges on said stationary assembly, respectively;
a plurality of torsionally flexible vibration isolating arms each having a motor mounted section associated with a respective one of said openings in removable securing engagement with said stationary assembly, respectively, each of said motor mounted sections including flange means seated against said stationary assembly generally about said respective one of said openings for gripping in engagement with one of said opposed surfaces generally adjacent one of said opposed edges of said respective one of said openings, an aperture in said flange means, a pair of means for capturing therebetween said flange means, a first projection integral with one of said capturing means for extending through said aperture into deformed interfacing engagement with the other of said capturing means, one of said one and other capturing means extending through said respective one of said openings, second projection means on said one of said one and other capturing means and arranged in predetermined spaced relation with said flange means part for gripping in engagement with the other of said opposed surfaces generally adjacent said one opposed edge of said respective one of said openings, at least one tab lanced from another part of said flange means so as to extend generally angularly therefrom into said respetive one of said openings, and a free end on said at least one tab disposed in interfering fitting engagement with the other of said opposed edges of said respective one of said openings.

26. A motor mounting arrangement comprising:
an electric motor having a stationary assembly with a pair of opposed surfaces;
a plurality of openings arranged in preselected locations in said stationary assembly and intersecting with said opposed surfaces so as to define a pair of opposed edges on said stationary assembly, respectively; and
a plurality of torsionally flexible vibration isolating arms having a motor mounting section associated with said openings and secured to said stationary assembly, respectively, each of said motor mounting sections including an arm flange seated against one of said surfaces in gripping engagement therewith generally about a respective one of said openings, a first abutment member disposed at least in part within said respective one of said openings and arranged in rotation preventing engagement between said opposed edges, an aperture in said first abutment member, a second abutment member arranged in gripping engagement with the other of said opposed surfaces generally about said respective one of said openings, a projection on said second abutment extending through said aperture and fixedly interconnected with said arm flange, means on said first abutment member for interlocking in rotation preventing engagement with said second abutment member, and resilient means interposed between said arm flange and said first abutment member for urging said interlocking means into the rotation preventing engagement with said second abutment member.

27. A motor mounting arrangement comprising:
an electric motor having a stationary assembly with generally radially spaced inner and outer surfaces;
a plurality of openings arranged in preselected locations in said stationary assembly and intersecting with said inner and outer surfaces so as to respectively define a pair of opposed edges therebetween on said stationary assembly, respectively;
a plurality of torsionally flexible vibration isolating device assembled with respect to said openings and adapted for rotative movement into a preselected position with respect to said stationary assembly so as to be secured thereto, respectively, each of said devices including a flexible arm having a motor end flange disposed in gripping engagement with said outer surface generally about a respective one of said openings, a pair of members having a configuration at least in part complementary to that of said respective one of said openings so as to pass at least in part therethrough, a pair of opposite means on one of said members for abutment in rotation preventing engagement with said opposed edges, a plurality of depending legs on said one member and seated against the other of said members, an aperture in said one member, a projection on said other member extending through said aperture and fixedly connected with said arm flange, said arm being rotatable into the preselected position and said other member being conjointly rotatable therewith into gripping engagement with said inner surface and rotatable relative to said one member out of engagement with said depending legs thereof, a plurality of flats on said other member arranged so as to interlock with said depending legs of said one member upon the rotation of said other member relative thereto, and spring means interposed between said flange and said one member for moving it within said respective one of said opening toward said other member to effect the interlock between said flats thereof and the depending legs of said one member.

* * * * *